(12) United States Patent
Shikama et al.

(10) Patent No.: US 12,099,243 B2
(45) Date of Patent: Sep. 24, 2024

(54) OPTICAL CONNECTOR AND OPTICAL CONNECTION STRUCTURE

(71) Applicant: Nippon Telegraph and Telephone Corporation, Tokyo (JP)

(72) Inventors: Kota Shikama, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 268 days.

(21) Appl. No.: 17/632,976

(22) PCT Filed: Aug. 19, 2019

(86) PCT No.: PCT/JP2019/032231
§ 371 (c)(1),
(2) Date: Feb. 4, 2022

(87) PCT Pub. No.: WO2021/033230
PCT Pub. Date: Feb. 25, 2021

(65) Prior Publication Data
US 2022/0276450 A1 Sep. 1, 2022

(51) Int. Cl.
*G02B 6/38* (2006.01)
(52) U.S. Cl.
CPC ......... *G02B 6/3889* (2013.01); *G02B 6/3825* (2013.01); *G02B 6/3854* (2013.01)

(58) Field of Classification Search
CPC .................. G02B 6/3889; G02B 6/3854
See application file for complete search history.

(56) References Cited

FOREIGN PATENT DOCUMENTS

| EP | 2479594 A1 | 7/2012 |
| JP | 2001083369 A | 3/2001 |
| JP | 2018004830 A | 1/2018 |
| JP | 2019113596 A * | 7/2019 |

OTHER PUBLICATIONS

English Translation of JP 2019-113596 A (Year: 2019).*

* cited by examiner

*Primary Examiner* — Sung H Pak
(74) *Attorney, Agent, or Firm* — Slater Matsil, LLP

(57) ABSTRACT

An optical connector includes a ferrule, an optical fiber, a tube, and a holding component. The ferrule includes a guide hole. The ferrule is formed from either crystallized glass, borosilicate glass, or quartz glass. The optical fiber includes an optical fiber body and a cover that covers the optical fiber body. The tube is disposed on the fiber extension side of one end of the guide hole and houses the optical fiber extending out from the fiber extension side. The tube is formed from either glass or polyimide resin.

9 Claims, 12 Drawing Sheets

OPTICAL CONNECTOR AND OPTICAL CONNECTION STRUCTURE

CROSS-REFERENCE TO RELATED APPLICATIONS

This application is a national phase entry of PCT Application No. PCT/JP2019/032231, filed on Aug. 19, 2019, which application is hereby incorporated herein by reference.

TECHNICAL FIELD

The present invention relates to an optical connector and an optical connection structure for connecting together optical fibers.

BACKGROUND

In recent years, there has been a demand for a significant increase in communication capacity within and between data centers accompanying the increase in traffic consumption by individuals using video services, and the increase in traffic by corporations using the Internet of Things (IoT), cloud services, and the like. To achieve the increase in communication capacity, an optical interconnection technology using an optical transmission technology or the like used in optical communications has been introduced in place of a related-art short-distance communication method using electric signals.

In a typical method of the optical interconnection, signal processing is implemented by transmission between a light-emitting element such as a laser diode (LD) and a light-receiving element such as a photodiode (PD) disposed on a mounting board, by using an optical transmission medium, such as an optical waveguide and an optical fiber. In some transmission techniques, an optical modulation element and the like are integrated with or discretely connected to a light-emitting element, and, further, a driver for converting electricity to light and the like are connected thereto. A configuration including the above-mentioned light-emitting element, optical modulation element, driver, and the like is mounted on a mounting board as an optical transmitter.

Similarly, an optical processor and the like are appropriately integrated with or discretely connected to a light-receiving element, and, further, an electric amplification circuit for converting light to electricity and the like are connected thereto. A configuration including the above-mentioned light-receiving element, optical processor, electric amplification circuit, and the like is mounted on the mounting board as an optical receiver.

An optical transceiver, and the like obtained by integrating the optical transmitter and the optical receiver are mounted in a package or on the mounting board, and are optically connected to an optical transmission medium such as an optical fiber, thereby achieving the optical interconnection. Further, the optical interconnection is achieved via a repeater such as an optical switch in some topologies.

Further, an optical functional element including a planar lightwave circuit or the like made of quartz glass or the like may also be integrated along with the light-emitting element, the light-receiving element, and the optical modulation element. Examples of the optical functional element include a splitter, a wavelength multiplexer/demultiplexer, an optical switch, a polarization control element, and an optical filter. Hereinafter, a device in which the above-described light-emitting element, light-receiving element, optical modulation element, optical functional element, optical amplification element, and the like having the light propagation and waveguide mechanisms are integrated, is referred to as an "optical waveguide device". These optical waveguide devices are optically connected to and integrated with optical fibers, lenses, and the like, but may also be electrically connected by wire bonding, flip chip bonding, or the like in a case where electrical control is required.

In applications such as optical interconnection, when the optical waveguide device described above is mounted onto a mounting board, the optical waveguide device is installed in a package or the like in advance, and electrical terminals outside the package are electrically connected to the mounting board. In addition, the optical waveguide device may be mounted on a pedestal, called a subcarrier, an interposer, or the like, the optical waveguide device and the electrical wiring on the pedestal may be electrically connected, and then this structure is mounted on and similarly electrically connected to the mounting board.

In particular, in recent years, as described in PTL 1, a technology has been developed in which an electrical connection is formed via the reflow of a solder element, such as a ball grid array (BGA) or land grid array (LGA), provided on an interposer or the like on which an optical waveguide is mounted when mounting on a mounting board is performed. With the connection of such technology, optical waveguide devices, optical fibers optically connected thereto, and the like, will also be exposed to a high temperature environment during reflow. Thus, there is a demand for improvements in heat resistance of optical components for various types of optical waveguide devices.

CITATION LIST

Patent Literature

PTL 1: JP 2018-004830 A.

SUMMARY

Technical Problem

However, with regard to the heat resistance of various components for optical waveguide devices, not the heat resistance of the optical waveguide device itself, but the heat resistance of the peripheral optical fiber components, particularly the heat resistance of the resin in the optical fiber component, is problematic. For example, as described in PTL 1, an adhesive is used for an optical waveguide device and an optical fiber connection component. Resins such as this adhesive are normally not able to withstand the high temperatures, such as 250° C., used in soldering or the like. Thus, manufacture using reflow or the like described above causes problems such as member deterioration or an increase in loss due to displacement of the optical waveguide device and the optical fiber from their optimal position.

Moreover, an optical connector (optical receptacle) is used for optical fibers on the mounting board or for input and output from the mounting board to the outside. Because various resins are also used in this optical connector, the high temperature conditions of the reflow process may cause problematic degradation of the optical connector.

Embodiments of the present invention have been made to solve the problems described above and has an object of providing a highly heat-resistant optical connector that does not lose performance even when subjected to the temperatures of the process of mounting an optical functional element on a mounting board.

Means for Solving the Problem

An optical connector according to embodiments of the present invention includes: a ferrule including a guide hole; an optical fiber including an optical fiber body and a cover configured to cover the optical fiber body, the optical fiber body with the cover removed being housed in the guide hole; a tube disposed on a fiber extension side at one end of the guide hole, the tube being configured to house the optical fiber extending out from the fiber extension side; a holding component including a first housing portion configured to house the ferrule and a second housing portion where the tube ends, the holding component being configured to hold the ferrule and the tube such that the ferrule and the tube are joined together; and an adhesive with which a space between the guide hole and the optical fiber body, a space between the second housing portion and the tube, and a space between the tube and the optical fiber are filled, wherein the ferrule is formed from crystallized glass, borosilicate glass, or quartz glass; the tube is formed from glass or polyimide resin; and the adhesive with which the space between the tube and the optical fiber is filled is formed such that the adhesive does not spew out from one end of the tube on a side where the optical fiber extends out.

An optical connection structure according to embodiments of the present invention is an optical connection structure in which two of the optical connectors described above are connected, the optical connection structure including: a sleeve configured to fix together the ferrules projecting from the first housing portions, with optical input/output ends of the two optical connectors brought together; and a spring member configured to press the two optical connectors against one another.

As described above, according to embodiments of the present invention, a tube housing an optical fiber extending out from a fiber extension side is disposed on the fiber extension side at one end of a guide hole of a ferrule. Thus, a highly heat-resistant optical connector can be provided that does not lose performance even when subjected to the temperatures of the process of mounting an optical functional element on a mounting board.

DETAILED DESCRIPTION OF ILLUSTRATIVE EMBODIMENTS

Hereinafter, an optical connector according to embodiments of the present invention will be described.

First Embodiment

Figure 1:
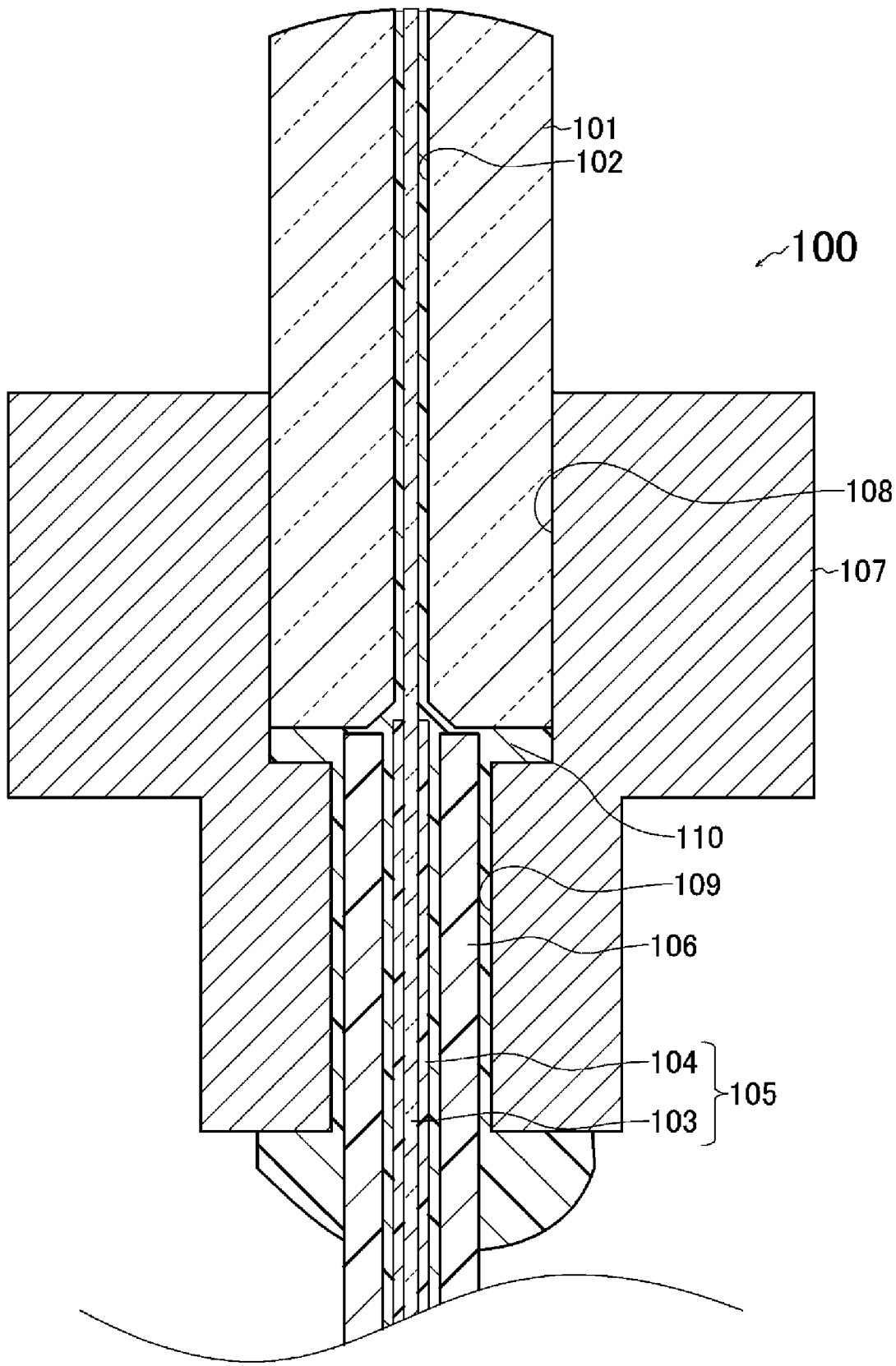
FIG. 1 is a cross-sectional view illustrating a configuration of an optical connector according to a first embodiment of the present invention.

First, an optical connector 100 according to a first embodiment of the present invention will be described with reference to FIG. 1. The optical connector 100 includes a ferrule 101, an optical fiber 105, a tube 106, and a holding component 107.

The ferrule 101 includes a guide hole 102. The optical fiber 105 includes an optical fiber body 103 and a cover 104 that covers the optical fiber body 103. The optical fiber body 103 with the cover 104 removed is housed in the guide hole 102 of the ferrule 101. The optical fiber body 103 is a quartz optical fiber made of a well-known quartz-based material. The ferrule 101 is formed from crystallized glass, borosilicate glass, or quartz glass.

The tube 106 is disposed on the fiber extension side at one end of the guide hole 102 and houses the optical fiber 105 extending out from the fiber extension side. The tube 106 is formed from glass or polyimide resin. The tube 106 may be formed from quartz glass or borosilicate glass, for example.

The holding component 107 includes a first housing portion 108 housing the ferrule 101 and a second housing portion 109 where the tube 106 ends and holds the ferrule 101 and the tube 106 such that the ferrule 101 and the tube 106 are joined together. The optical fiber 105 is housed in the ferrule 101 and the tube 106 held and joined together by the holding component 107. Note that in the first embodiment, the tube 106 houses a region where the optical fiber body 103 is covered by the cover 104. In this example, the inner diameter of the tube 106 is slightly larger than the outer diameter of the optical fiber 105 in the region where the optical fiber body 103 is covered by the cover 104.

Here, the optical fiber 105 is adhesively fixed by an adhesive 110 in the ferrule 101 and the second housing portion 109 of the holding component 107. In the first embodiment, the space between the guide hole 102 and the optical fiber body 103, the space between the second housing portion 109 and the tube 106, and the space between the tube 106 and the optical fiber 105 are filled with the adhesive 110. Furthermore, the adhesive 110 with which the space between the tube 106 and the optical fiber 105 is filled is formed without spewing out from one end of the tube 106 on the side where the optical fiber 105 extends out.

In this manner, according to the first embodiment, the optical fiber 105 does not come into contact with the adhesive 110 in the region where the optical fiber 105 extends out without being covered by the ferrule 101 or the holding component 107. Thus, according to the first embodiment, a region where the adhesive 110 and the optical fiber 105 (the cover 104) come into contact with the surrounding environment (atmosphere) is not formed, circumventing the problem caused by the expansion of the adhesive 110 due to heating in the reflow process and the like. This problem will be described below. In addition, according to the first embodiment, the optical fiber 105 is housed in the ferrule 101 and the tube 106, which are made of a material having heat resistance, at a section where the optical fiber 105 and the adhesive 110 come into contact. As a result, the first embodiment can provide a highly heat-resistant optical connector that does not lose performance even when subjected to the temperatures of the process of mounting an optical functional element on a mounting board.

Figure 2:
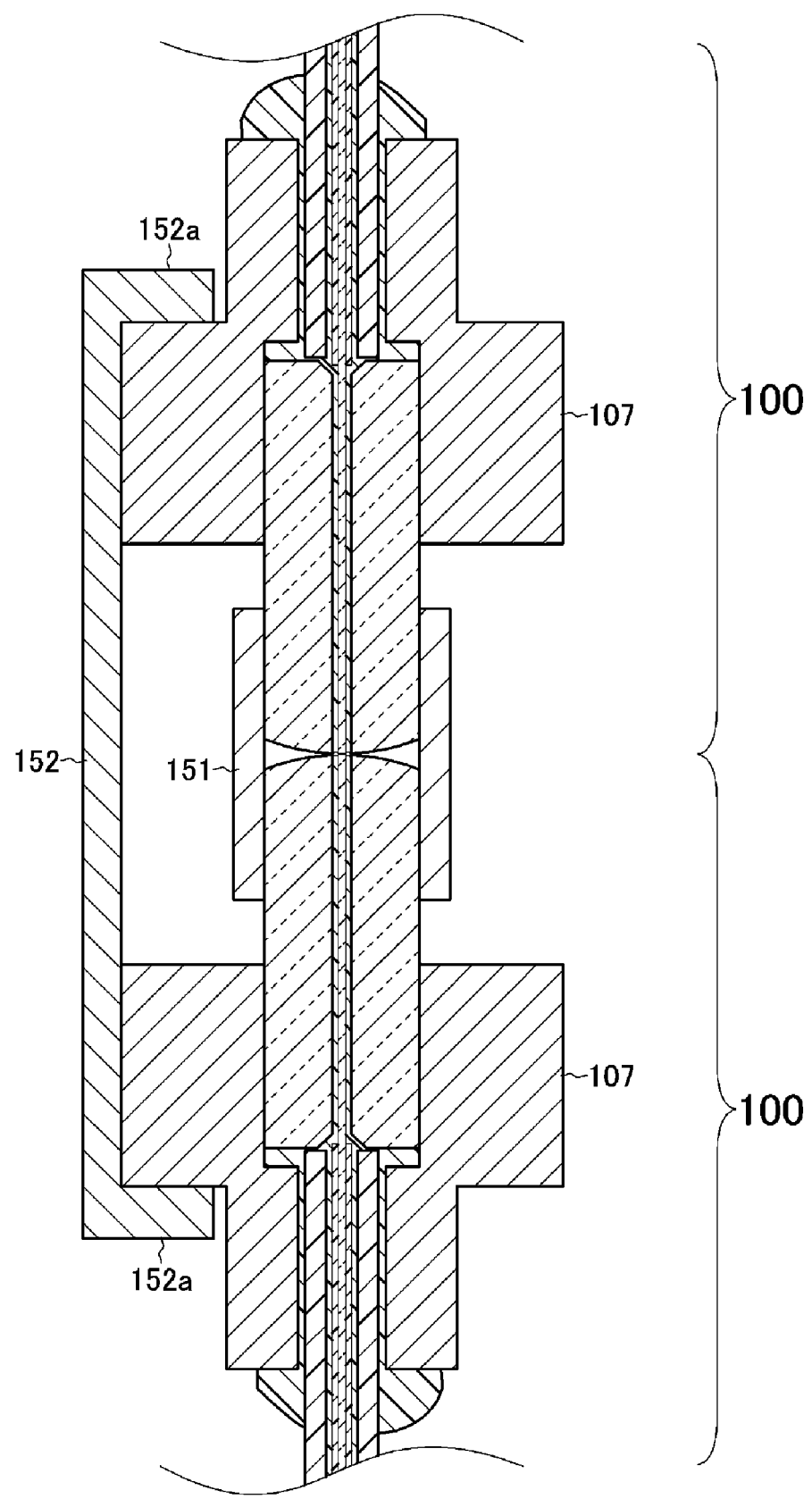
FIG. 2 is a cross-sectional view illustrating a configuration of an optical connection structure according to the first embodiment of the present invention.

Next, the optical connection structure formed by two optical connectors 100 will be described with reference to FIGS. 2 and 3. First, the ferrules 101 projecting from the first housing portions 108 are fixed together using a sleeve 151 with the optical input/output ends of two optical connectors 100 brought together. The sleeve 151 has a cylindrical shape so as to house the ferrule 101. Moreover, a spring member 152 presses the two optical connectors 100 against one another. The spring member 152 includes L-shaped catches 152a that are used, for example, as a clip of a mechanical transfer (MT) connector. The catches 152a of the spring member 152 are hooked onto the step portions of the holding components 107, applying stress to the tips of the ferrules 101 of the two optical connectors 100 and bringing the end surfaces of the optical fibers 105 into close contact with each other. In this manner, a physical contact connection is achieved in which the end surfaces of the optical fibers 105 are completely in close contact with each other.

Figure 3:
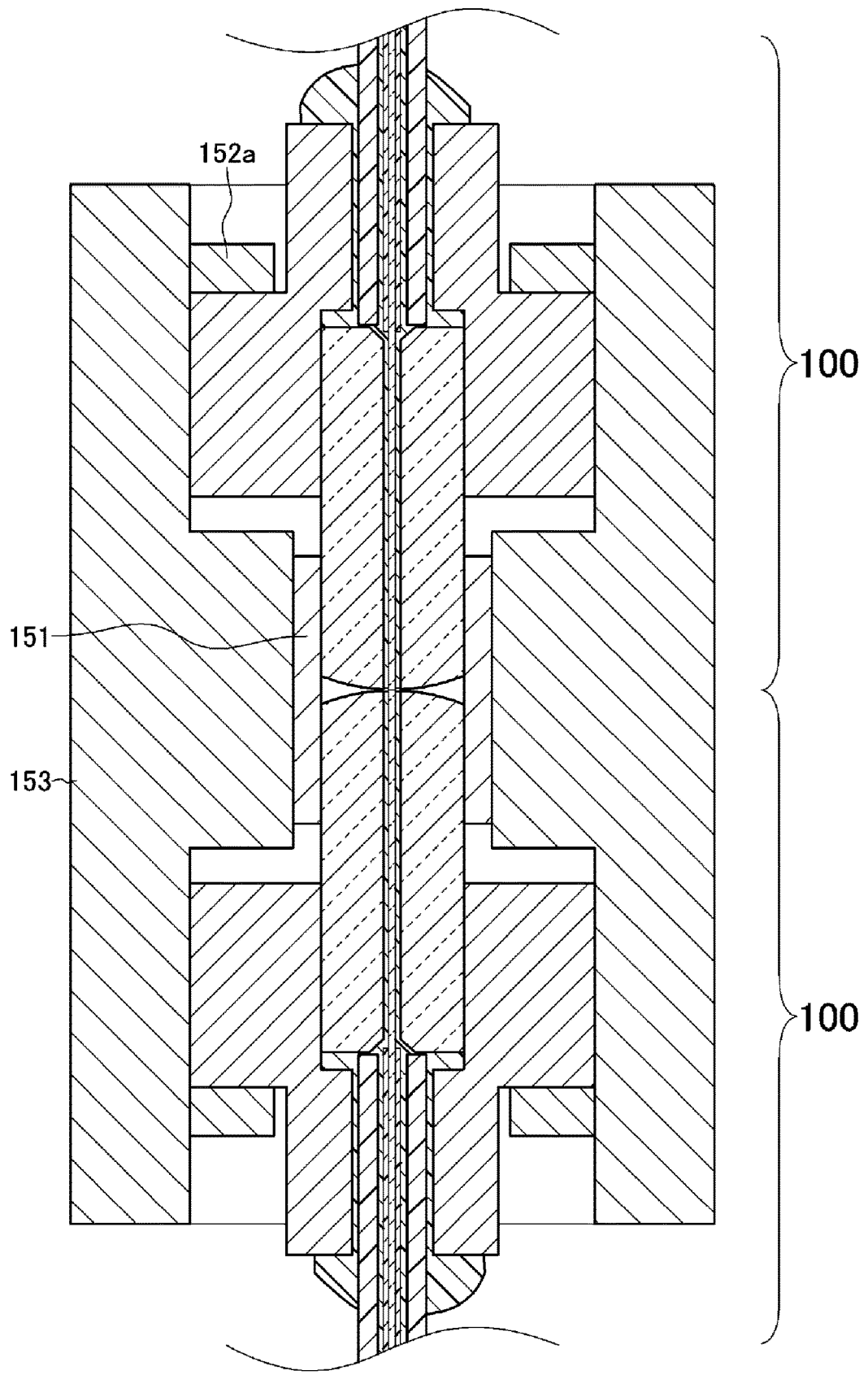
FIG. 3 is a cross-sectional view illustrating a configuration of an optical connection structure according to the first embodiment of the present invention.

Moreover, as illustrated in FIG. 3, regarding the optical connection structure, the two optical connectors 100 are housed in a housing 153 together with the spring members 152. The housing 153 is formed from a metal, a ceramic, or a super engineering plastic.

In a known optical connector, in addition to a zirconia-based ferrule, a coil spring, a stop ring, a plug frame, a plug and housing, and a rubber boot made of resin, and the like may be used. Because this resin is a thermoplastic suitable for injection molding, there is a problem in that the housing itself may be melted in a high temperature environment such as that used in reflow process and the like.

In contrast, according to the first embodiment described above, because the housing 153 is formed from a ceramic or metal having high heat resistance, problems such as melting can be prevented even before and after the reflow process. Even in a case where the housing 153 is formed from a super engineering plastic, heating in the reflow process or the like may slightly change the dimensions of the housing 153. However, in a case where the heat treatment takes a short amount of time, the small amount of deformation is insignificant, and thus the same effect can be achieved.

In addition, in the first embodiment, the ferrule 101 is formed from a glass-based material, such as crystallized glass, borosilicate glass, quartz glass, and the like, and thus has a higher heat resistance. A known connector includes a ferrule made from zirconia. In this case, the thermal expansion coefficient of zirconia is ten or more times larger than that of the quartz that constitutes the optical fiber. Thus, a ferrule composed of zirconia varies greatly in terms of position relative to the optical fiber as the temperature increases. In particular, when the temperature exceeds 250° C., in conjunction with the softening of the adhesive, there is also a problem in that the relative position between the ferrule and the optical fiber changes by 0.51 mm or more, causing peeling of the adhesive. With this problem, it is clear that a physical contact such as that described above cannot be achieved even in a case in which the ferrules are pressed together when two optical connectors are connected.

In contrast to known techniques, according to the first embodiment, the ferrule 101 is formed from crystallized glass, borosilicate glass, quartz glass, or the like. Thus, the difference in the thermal expansion coefficient between the ferrule 101 and the optical fiber 105 described above can be reduced, and the displacement in the relative position of the two when heated can be reduced to approximately ⅕, thus it has been empirically shown that peeling is not caused. When a high temperature of approximately 250° C. is applied, relative positional displacement occurs between the ferrule 101 and the optical fiber 105, but this displacement is reduced to ⅕, which is within the range of elastic deformation of the adhesive 110. Thus, when the temperature is returned to room temperature, the relative positional relationship returns to the original state. As described above, according to the first embodiment, a physical contact connection can be achieved and highly reliable and high performance optical connection can be achieved even through a high temperature process such as reflow.

Second Embodiment

Figure 4:
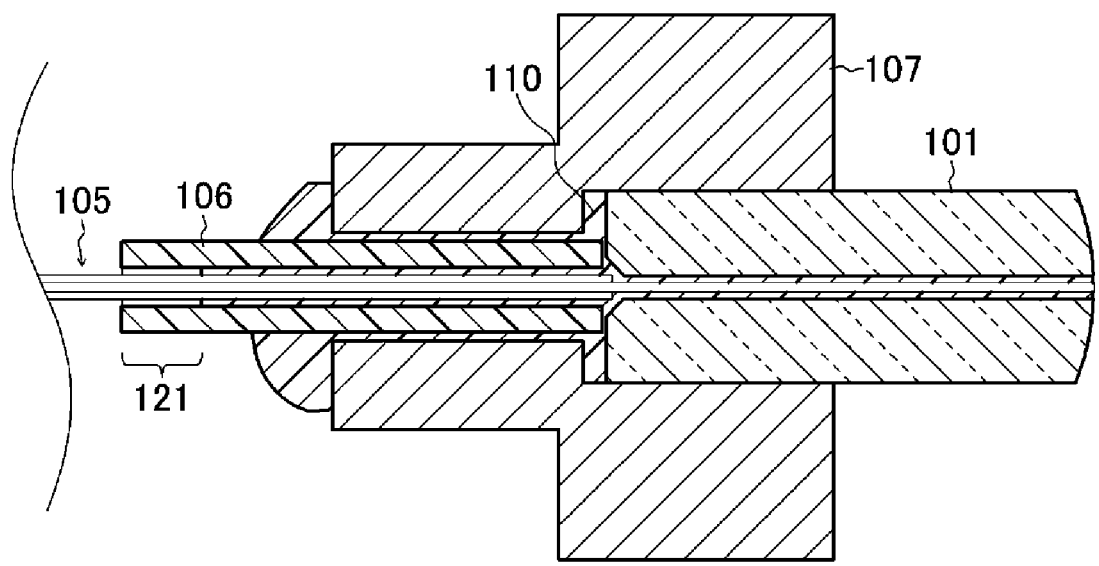
FIG. 4 is a cross-sectional view illustrating a configuration of an optical connector according to a second embodiment of the present invention.

Next, an optical connector according to the second embodiment of the present invention will be described with reference to FIG. 4. This optical connector, i.e., the optical connector 100, includes the ferrule 101, the optical fiber 105, the tube 106, and the holding component 107. Moreover, the optical fiber 105 is adhesively fixed by an adhesive 110 in the ferrule 101 and the second housing portion 109 of the holding component 107. These configurations are similar to those of the first embodiment described above.

In the second embodiment, an unfilled portion 121 not filled with the adhesive 11o is provided between the tube 106 and the optical fiber 105 from one end of the tube 106 on the side where the optical fiber 105 extends out to partway along the tube 106. According to the second embodiment, the unfilled portion 121 is provided to prevent the adhesive 110 from spewing out from one end of the tube 106 on the side where the optical fiber 105 extends out. This helps suppress a region where the adhesive 110 and the cover 104 come into contact with the atmosphere, which is formed by the adhesive 110 that spews out.

Third Embodiment

Figure 5:
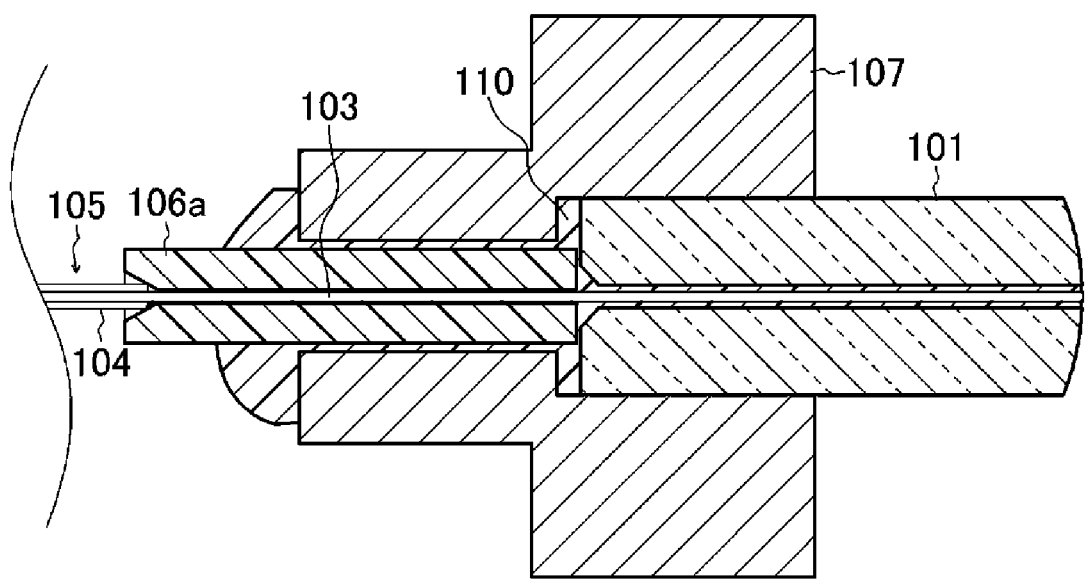
FIG. 5 is a cross-sectional view illustrating a configuration of an optical connector according to a third embodiment of the present invention.

Next, an optical connector according to the third embodiment of the present invention will be described with reference to FIG. 5. This optical connector, i.e., the optical connector 100, includes the ferrule 101, the optical fiber 105, and the holding component 107. Moreover, the optical fiber 105 is adhesively fixed by an adhesive 110 in the ferrule 101 and the second housing portion 109 of the holding component 107. These configurations are similar to those of the first embodiment described above.

In the third embodiment, the optical fiber body 103 with the cover 104 removed is housed in a tube 106a. In this example, the inner diameter of the tube 106a is slightly larger than the outer diameter of the optical fiber body 103 that is not covered by the cover 104, and the adhesive 110 between the optical fiber body 103 and the tube 106a is thinner. For example, the adhesive 110 between the optical fiber body 103 and the tube 106a is formed thinner than in the first embodiment described above. Thus, even when the adhesive 110 thermally expands due to heating during a reflow process or the like, the effects of stress and the like on the optical fiber body 103 associated therewith can be made smaller.

In addition, in the third embodiment, the cover 104 is formed in a region of the optical fiber 105 outside one end of the tube 106a on the side where the optical fiber 105 extends out. Thus, in the region outside one end of the tube 106a on the side where the optical fiber 105 extends out, there are no sections where the adhesive 110 comes into contact with the cover 104.

Fourth Embodiment

Figure 6:
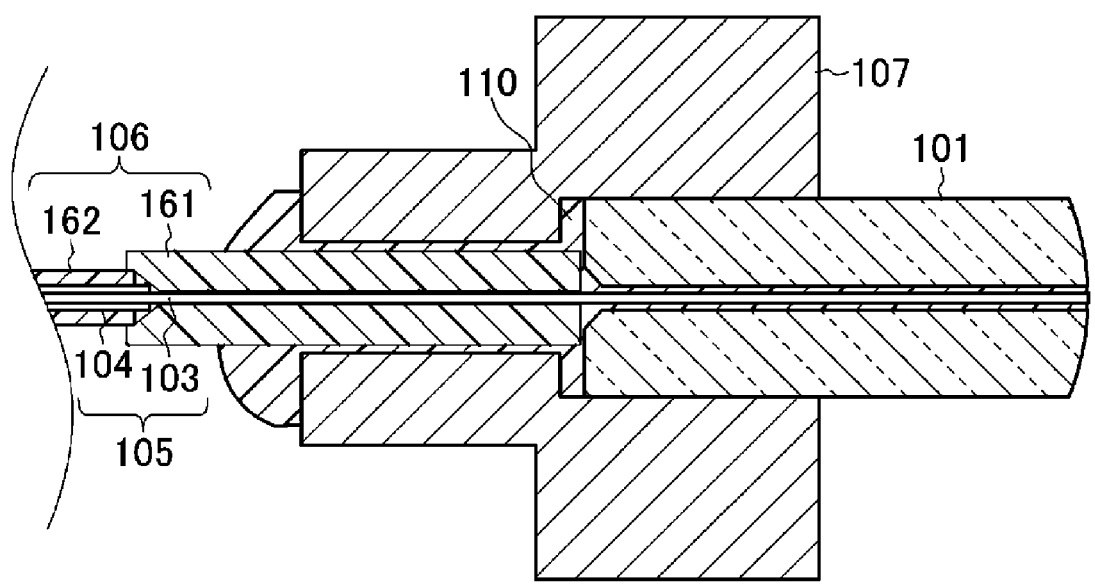
FIG. 6 is a cross-sectional view illustrating a configuration of an optical connector according to a fourth embodiment of the present invention.

Next, an optical connector according to the fourth embodiment of the present invention will be described with reference to FIG. 6. This optical connector, i.e., the optical connector 100, includes the ferrule 101, the optical fiber 105, and the holding component 107. Moreover, the optical fiber 105 is adhesively fixed by an adhesive 110 in the ferrule 101 and the second housing portion 109 of the holding component 107. These configurations are similar to those of the first embodiment described above.

In the fourth embodiment, the tube 106 includes a first tube 161 on the side where the ferrule 101 is located and a second tube 162 continuous with the first tube 161. The second tube 162 is connected to the first tube 161 along the extension direction of the tube 106. In the portion of this connection, the end of the first tube 161 gradually increases in inner diameter, and the joining end fits on the second tube 162. In addition, the portion of the connection can be covered with an adhesive (not illustrated) and adhesively fixed. In this example, the first tube 161 houses the optical fiber body 103, and the second tube 162 houses the optical fiber 105 in which the optical fiber body 103 is covered by the cover 104.

In this example, in a similar manner to the tube 106a of the third embodiment, the inner diameter of the first tube 161 is slightly larger than the outer diameter of the optical fiber body 103 not covered by the cover 104. On the other hand, the second tube 162 is slightly larger than the outer diameter of the optical fiber 105 in which the optical fiber body 103 is covered by the cover 104. The first tube 161 is formed from a glass-based material, and the second tube 162 is formed from a resin such as polyimide.

According to the fourth embodiment, in the same manner as in the embodiments described above, a region where the adhesive 110 and the cover 104 come into contact with the atmosphere is not formed. In addition, according to the fourth embodiment, the second tube 162 is formed from a flexible resin so that the optical fiber 105 on the extension side can be easily bent. Note that the second tube 162 may be formed by applying or adhering a heat-resistant resin such as polyimide on the outer circumferential surface of the cover 104 of the optical fiber 105 prior to incorporation into the optical connector.

Fifth Embodiment

Figure 7:
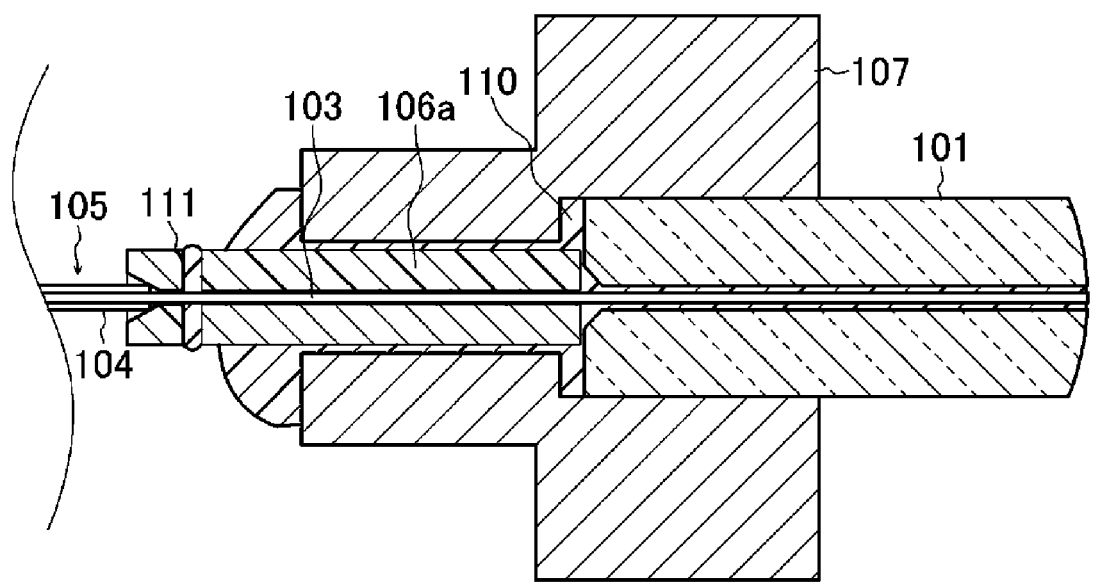
FIG. 7 is a cross-sectional view illustrating a configuration of an optical connector according to a fifth embodiment of the present invention.

Next, an optical connector according to the fifth embodiment of the present invention will be described with reference to FIG. 7. This optical connector, i.e., the optical connector 100, includes the ferrule 101, the optical fiber 105, the tube 106a, and the holding component 107. Moreover, the optical fiber 105 is adhesively fixed by an adhesive 110 in the ferrule 101 and the second housing portion 109 of the holding component 107. The tube 106a houses the optical fiber body 103 with the cover 104 removed. These configurations are similar to those of the third embodiment described above.

In the fifth embodiment, the portion of the tube 106a outside the holding component 107 is provided with a through-hole 111 that extends through the tube wall. With this configuration, even when the amount of the adhesive 110 increases, the adhesive 110 spews into the through-hole 110 in due to the surface tension of the through-hole in. As a result, the adhesive 110 is prevented from spewing out from one end of the tube 106a on the side where the optical fiber 105 extends out.

Figure 8:
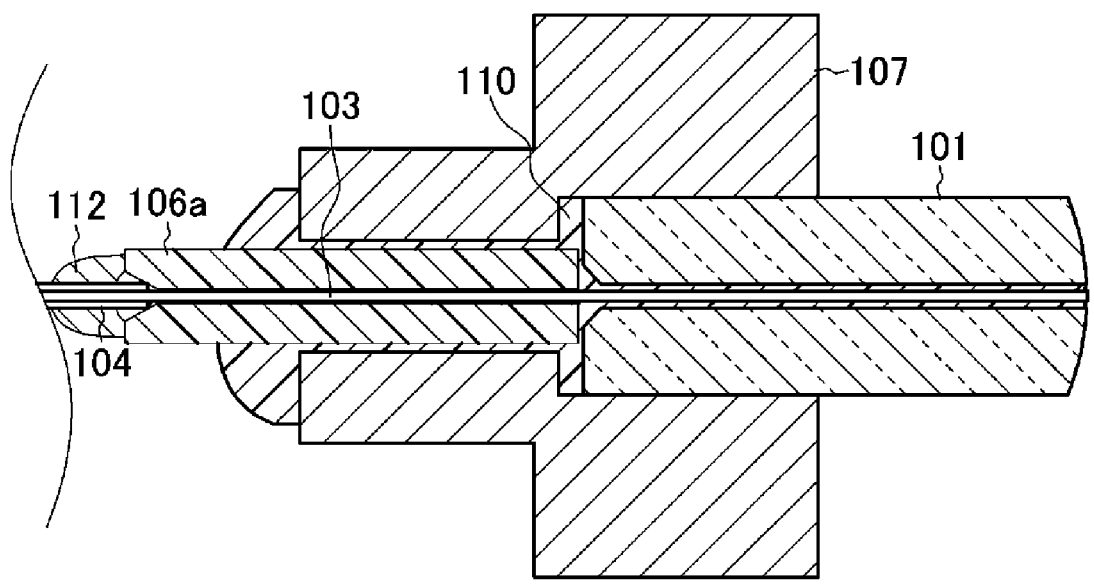
FIG. 8 is a cross-sectional view illustrating a configuration of another optical connector according to a fifth embodiment of the present invention.

Here, as illustrated in FIG. 8, a second adhesive 112 can also be provided on one end of the tube 106a so as to cover a portion of the optical fiber 105 extending out from the tube 106a. The second adhesive 112 is formed from a material having a very small Young's modulus. This reduces the stress even when the second adhesive 112 thermally expands, and even in a case where a region is formed where the second adhesive 112 and the cover 104 come into contact with the atmosphere, problems caused by the expansion of the second adhesive 112 do not occur.

Figure 9:
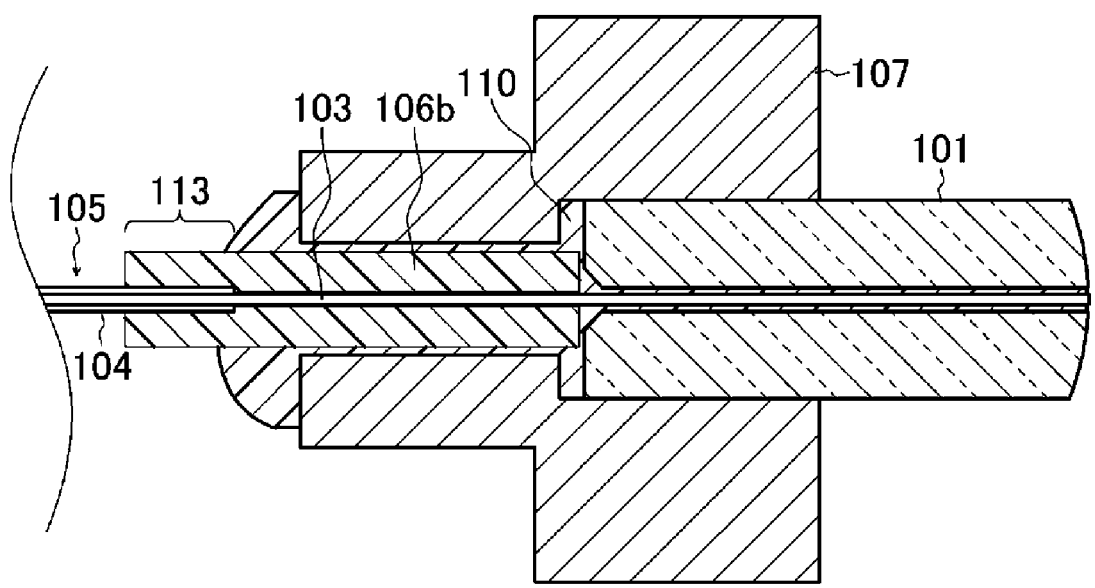
FIG. 9 is a cross-sectional view illustrating a configuration of another optical connector according to a fifth embodiment of the present invention.

In addition, as illustrated in FIG. 9, a region 113 is provided from one end of a tube 106b on the side where the optical fiber 105 extends out to partway along the tube 106b, and the cover 104 may be formed in the region 113. The region 113 is a region in which the inner diameter of the tube 106b is larger than that in the other regions and is slightly larger than the outer diameter of the optical fiber 105 in which the optical fiber body 103 is covered by the cover 104. With this configuration as well, it is possible to suppress the adhesive 110 spewing out from one end of the tube 106b on the side where the optical fiber 105 extends out. As a result, a region where the adhesive 110 and the cover 104 come into contact with the atmosphere is not formed.

Figure 10A:
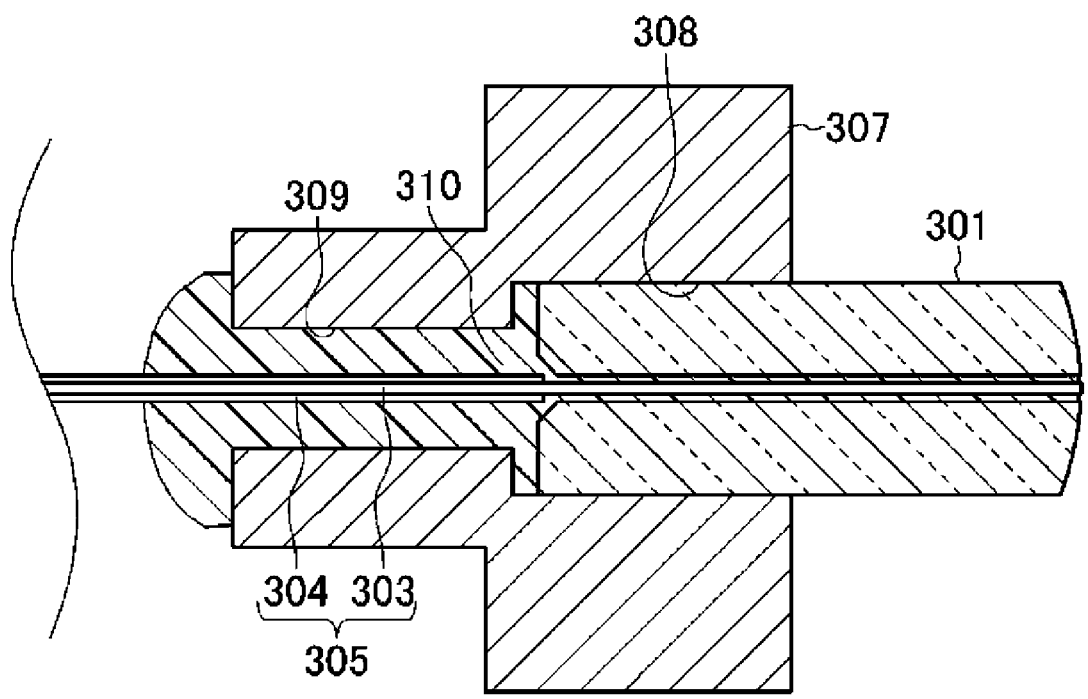
FIG. 10A is a cross-sectional view illustrating a configuration of a known optical connector.
Figure 10B:
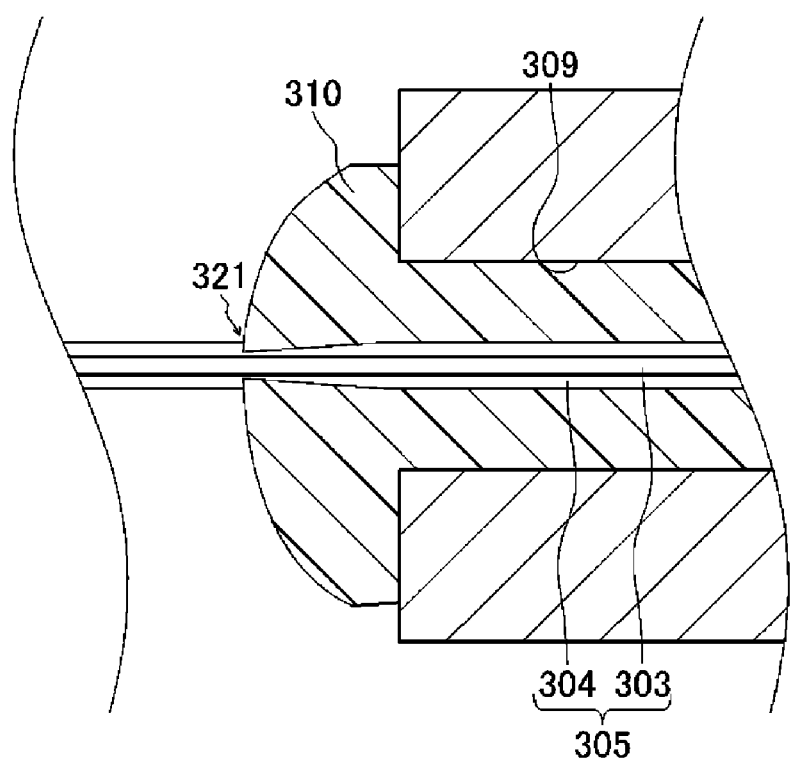
FIG. 10B is a cross-sectional view illustrating a configuration of a portion of a known optical connector.
Figure 10C:
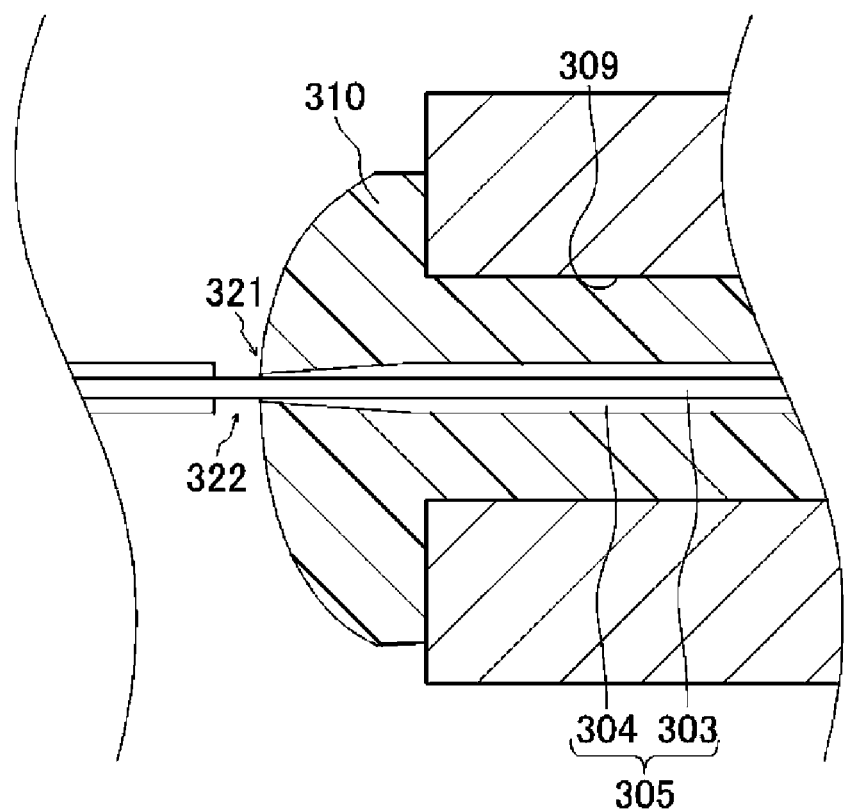
FIG. 10C is a cross-sectional view illustrating a configuration of a portion of a known optical connector.

Next, the problem caused by a region being formed where the adhesive and the optical fiber (cover) come into contact with the surrounding environment (atmosphere) will be described with reference to FIGS. 10A, 10B, and 10C. A known optical connector includes a ferrule 301, an optical fiber 305, and a holding component 307, as illustrated in FIGS. 10A, 10B, and 10C. The optical fiber 305 includes an optical fiber body 303 and a cover 304 that covers the optical fiber body 303, and the optical fiber body 303 with the cover 304 removed is housed in a guide hole of the ferrule 301. The holding component 307 includes a third housing portion 308 that houses the ferrule 301 and a second housing portion 309 where the optical fiber 305 extending out from the ferrule 301 ends. The optical fiber 305 is adhesively fixed by an adhesive 310 in the ferrule 301 and the second housing portion 309 of the holding component 307.

For example, when a known optical connector is actually heated at a peak temperature of 250° C. in a solder reflow process or the like, the temperature reaches at least the glass transition temperature of the ferrule 301 and the epoxy-based adhesive 310. In such a high-temperature environment at or above the glass transition temperature, the resin softens. Additionally, at or above the glass transition temperature, the thermal expansion of the resin is about ten times larger than that at room temperature. This results in the adhesive 310 expanding greatly in a heating environment such as that described above.

Due to the thermal expansion of the adhesive 310 in this manner, as illustrated in FIG. 10B, in a region 321 where the adhesive 310 and the optical fiber 305 (cover 304) come into contact with the surrounding environment (atmosphere), the thermal expansion of the adhesive 310 causes the end portion of the adhesive 310 to enter the cover 304. Due to the end portion of the adhesive 310 entering the cover 304, as illustrated in FIG. 10C, a problem occurs in that, in the region 321, a region 322 is formed where the cover 304 is peeled off and the optical fiber body 303 is exposed. The inventors have empirically found this phenomenon.

In the region 322, moisture is more likely to enter and the mechanical reliability in relation to stress from the outside is greatly decreased. This causes a problematic degradation in the performance of the optical fiber 305. In addition, the inventors have found that the exposure of the optical fiber body 303 in the region 322 as described above is due to the expansion of the adhesive 310, and that the greater the thickness of the adhesive 310 that comes into contact with the optical fiber 305, the more likely it is to occur.

In the optical connector according to the embodiments described above, because the region of the optical fiber provided with the cover is housed in the tube, the thickness of the adhesive that comes into contact with the cover can be limited by the difference between the inner diameter of the tube and the outer diameter of the optical fiber, allowing the problem caused by the expansion of the adhesive described above to be eliminated. The difference between the outer diameter of the optical fiber including the cover and the inner diameter of the tube is preferably small, and this difference is preferably equal to or less than 100 μm, and more preferably equal to or less than 10 μm.

Furthermore, in a case where the tube is formed from polyimide or a glass, the coefficient of thermal expansion is very small or substantially equal to that of the optical fiber, so it is possible to greatly reduce the stress on the cover caused by the expansion of the adhesive. Moreover, the expansion of the adhesive around the outside of the tube is absorbed by the tube, and no direct stress is applied to the optical fiber (cover). This helps prevent a reduction in reliability associated with peeling of the cover even after heating in a reflow process.

As described above, according to embodiments of the present invention, a tube housing an optical fiber extending out from a fiber extension side is disposed on the fiber extension side at one end of a guide hole of a ferrule. Thus, a highly heat-resistant optical connector can be provided that does not lose performance even when subjected to the temperatures of the process of mounting an optical functional element on a mounting board.

Meanwhile, the present invention is not limited to the embodiment described above, and it will be obvious to those skilled in the art that various modifications and combinations can be implemented within the technical idea of the present invention.

REFERENCE SIGNS LIST

100 Optical connector
101 Ferrule
102 Guide hole
103 Optical fiber body
104 Cover
105 Optical fiber
106 Tube
107 Holding component
108 First housing portion
109 Second housing portion
110 Adhesive.

The invention claimed is:

1. An optical connector, comprising:
a ferrule including a guide hole;
an optical fiber including an optical fiber body and a cover, the cover covering a first portion of the optical fiber body, a second portion of the optical fiber body being housed in the guide hole, wherein the cover does not cover the second portion of the optical fiber body;
a tube disposed on a fiber extension side at one end of the guide hole, the tube being configured to house the first portion of the optical fiber body and partially house the second portion of the optical fiber body that is not covered by the cover, the first portion of the optical fiber body extending out from the fiber extension side;
a holding component including a first housing portion housing an end of the ferrule and a second housing portion housing an end of the tube, the holding component being configured to hold the ferrule and the tube such that the ferrule and the tube are joined together; and
an adhesive filling a space between the guide hole and the optical fiber body, a space between the second housing portion and the tube, and a space between the tube and the optical fiber, wherein
the ferrule comprises crystallized glass, borosilicate glass, or quartz glass;
the tube comprises glass or polyimide resin; and
the adhesive with which the space between the tube and the optical fiber is filled is disposed such that the adhesive does not spew out from a first end of the tube on a side where the optical fiber extends out.

2. The optical connector according to claim 1, wherein the cover extends to the first end of the tube on the side where the optical fiber extends out to partway along the tube.

3. The optical connector according to claim 1, further comprising:
an unfilled portion not filled with the adhesive between the tube and the optical fiber, the unfilled portion extending from the first end of the tube on the side where the optical fiber extends out to partway along the tube.

4. The optical connector according to claim 1, wherein the tube at a portion outside the holding component includes a through-hole that extends through a tube wall.

5. The optical connector according to claim 1, wherein the tube includes a first tube on a side where the ferrule is located and a second tube that is continuous with the first tube.

6. An optical connection structure comprising:
a sleeve configured to fix a first ferrule projecting from a first housing portion of a first optical connector to a second ferrule projecting from a second housing portion of a second optical connector, wherein the sleeve is further configured to bring a first optical input/output end of the first optical connector and a second optical input/output end of the second optical connector together; and
a spring member configured to press the first and second optical connectors against one another;
wherein the first optical connector comprises:
the first ferrule including a first guide hole;
a first optical fiber including a first optical fiber body and a first cover, the first cover covering a first portion of the first optical fiber body, a second portion of the first optical fiber body being housed in the first guide hole;

a first tube disposed on a first fiber extension side at one end of the first guide hole, the first tube being configured to house the first portion of the first optical fiber body, the first portion of the first optical fiber body extending out from the first fiber extension side, wherein the cover extends laterally past a sidewall of the first tube that faces the first ferrule into the first guide hole of the first ferrule;

a first holding component including the first housing portion housing the first ferrule and a third housing portion housing the first tube, the first holding component being configured to hold the first ferrule and the first tube such that the first ferrule and the first tube are joined together; and a first adhesive filling a space between the first guide hole and the first optical fiber body, a space between the third housing portion and the first tube, and a space between the first tube and the first optical fiber, wherein the first ferrule comprises crystallized glass, borosilicate glass, or quartz glass, wherein the first tube comprises glass or polyimide resin, and wherein the first adhesive with which the space between the first tube and the first optical fiber is filled is disposed such that the first adhesive does not spew out from one end of the first tube on a side where the first optical fiber extends out; and wherein the second optical connector comprises:

the second ferrule including a second guide hole;

a second optical fiber including a second optical fiber body and a second cover, the second cover covering a first portion of the second optical fiber body, a second portion of the second optical fiber body being housed in the second guide hole;

a second tube disposed on a second fiber extension side at one end of the second guide hole, the second tube being configured to house the first portion of the second optical fiber, the first portion of the second optical fiber extending out from the second fiber extension side;

a second holding component including the second housing portion housing the second ferrule and a fourth housing portion housing the second tube, the second holding component being configured to hold the second ferrule and the second tube such that the second ferrule and the second tube are joined together; and a second adhesive filling a space between the second guide hole and the second optical fiber body, a space between the fourth housing portion and the second tube, and a space between the second tube and the second optical fiber, wherein the second ferrule comprises crystallized glass, borosilicate glass, or quartz glass, wherein the second tube comprises glass or polyimide resin, and wherein the second adhesive with which the space between the second tube and the second optical fiber is filled is disposed such that the second adhesive does not spew out from one end of the second tube on a side where the second optical fiber extends out.

7. The optical connection structure according to claim 6, further comprising
a housing configured to house the first and second optical connectors together with the spring member, wherein the housing comprises a metal, a ceramic, or a super engineering plastic.

8. The optical connection structure according to claim 6, wherein the first housing portion is wider than the third housing portion, and wherein the first tube extends out of the third housing portion into the first housing portion.

9. The optical connection structure according to claim 6, wherein the first housing portion is wider than the second housing portion, and wherein the first tube extends out of the third housing portion into the second housing portion.

* * * * *